United States Patent
Hisamatsu

(10) Patent No.: US 10,282,317 B2
(45) Date of Patent: May 7, 2019

(54) SEMICONDUCTOR INTEGRATED CIRCUIT

(71) Applicants: KABUSHIKI KAISHA TOSHIBA, Minato-ku, Tokyo (JP); TOSHIBA ELECTRONIC DEVICES & STORAGE CORPORATION, Minato-ku, Tokyo (JP)

(72) Inventor: Yuji Hisamatsu, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 15/914,971

(22) Filed: Mar. 7, 2018

(65) Prior Publication Data

US 2019/0087361 A1 Mar. 21, 2019

(30) Foreign Application Priority Data

Sep. 19, 2017 (JP) ................................. 2017-179423

(51) Int. Cl.
| | |
|---|---|
| *G11C 7/10* | (2006.01) |
| *G06F 13/00* | (2006.01) |
| *G06F 13/16* | (2006.01) |
| *G06F 1/08* | (2006.01) |

(52) U.S. Cl.
CPC .............. *G06F 13/16* (2013.01); *G06F 1/08* (2013.01)

(58) Field of Classification Search
None
See application file for complete search history.

(56) References Cited

U.S. PATENT DOCUMENTS

| | | | | |
|---|---|---|---|---|
| 6,456,544 B1* | 9/2002 | Zumkehr | ............. | G11C 7/1051 365/193 |
| 2003/0147298 A1* | 8/2003 | Ooishi | ................ | G11C 7/1045 365/233.1 |
| 2003/0167374 A1* | 9/2003 | Hronik | ................ | G06F 13/4243 711/104 |
| 2008/0005518 A1* | 1/2008 | Gillingham | ......... | G06F 13/4243 711/167 |
| 2009/0043955 A1* | 2/2009 | Butt | ..................... | G11C 7/1051 711/105 |
| 2012/0223749 A1 | 9/2012 | Sasaki | | |

FOREIGN PATENT DOCUMENTS

| | | |
|---|---|---|
| JP | 2006227866 A | 8/2006 |
| JP | 2010021793 A | 1/2010 |
| JP | 2012181724 A | 9/2012 |

* cited by examiner

*Primary Examiner* — Hyun Nam
(74) *Attorney, Agent, or Firm* — Holtz, Holtz & Volek PC

(57) ABSTRACT

According to one embodiment, a semiconductor integrated circuit includes a bus master, a bus slave and a clock gating circuit. The bus master outputs an access request. The bus slave transmits a response to the access request to the bus master. The clock gating circuit shuts off clocks supplied to the bus slave. The bus slave includes a control circuit which outputs first and second signals in response to the access request; a first circuit which outputs a third signal in response to a clock supplied from the clock gating circuit, when the first signal is asserted; and a second circuit which receives the third signal output from the first circuit and the second signal, and outputs a fourth signal as the response to the bus master, when the second signal is asserted.

16 Claims, 4 Drawing Sheets

SEMICONDUCTOR INTEGRATED CIRCUIT

CROSS-REFERENCE TO RELATED APPLICATIONS

This application is based upon and claims the benefit of priority from Japanese Patent Application No. 2017-179423, filed Sep. 19, 2017, the entire contents of which are incorporated herein by reference.

FIELD

Embodiments described herein relate generally to a semiconductor integrated circuit including bus masters and bus slaves.

BACKGROUND

A semiconductor integrated circuit such as a system LSI includes, as its configuration elements, bus masters, bus slaves and buses connecting the bus masters and the bus slaves to each other. In this type of semiconductor integrated circuit, clock gating is widely used as a technique for reducing power consumption.

Clock gating is a technique which reduces power consumption by shutting off clocks supplied, for example, to bus slaves. Clock gating is featured in that the state transition time between a normal state and a low power-consumption state is comparatively short and the clock tree power, which constitutes the majority of a dynamic current, can be suppressed.

DETAILED DESCRIPTION

In general, according to one embodiment, a semiconductor integrated circuit includes a bus master, a bus slave and a clock gating circuit. The bus master outputs an access request. The bus slave receives the access request and transmits a response to the access request to the bus master. The clock gating circuit shuts off clocks supplied to the bus slave. The bus slave includes a control circuit which outputs a first signal and a second signal in response to the access request; a first circuit which outputs a third signal in response to a clock supplied from the clock gating circuit, when the first signal is asserted; and a second circuit which receives the third signal output from the first circuit and the second signal, and which outputs a fourth signal as the response to the access request to the bus master, when the second signal is asserted.

Embodiments will be described with reference to the accompanying drawings. In the description below, elements having the same functions and configurations will be denoted by the same reference symbols. Each of the embodiments described below merely shows an exemplary apparatus and method that implement the technical ideas of the embodiments. The technical ideas are not limited to the element materials, shapes, structures, arrangements etc. described below.

The functional blocks need not be such blocks as will be described below. For example, part of the functions of one exemplary functional block may be implemented by another functional block. In addition, an exemplary functional block may be divided into more specific functional blocks.

[1] First Embodiment

A semiconductor integrated circuit according to the first embodiment will be described.

[1-1] Configuration of Semiconductor Integrated Circuit

Figure 1:
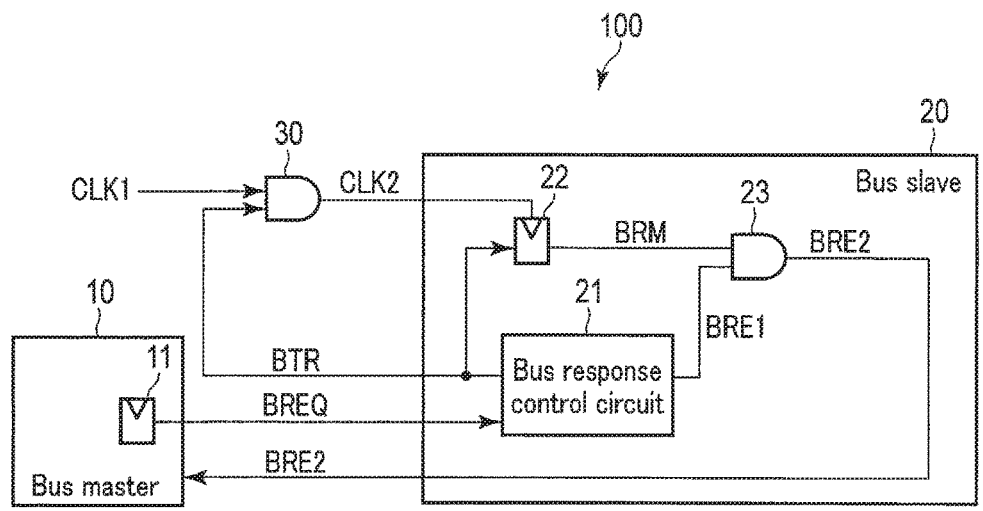
FIG. 1 is a diagram illustrating a configuration of a semiconductor integrated circuit according to the first embodiment.

FIG. 1 is a diagram illustrating a configuration of a semiconductor integrated circuit according to the first embodiment. The semiconductor integrated circuit 100 includes a bus master 10, a bus slave 20 and a clock gating circuit 30. The bus master 10, the bus slave 20 and the clock gating circuit 30 are electrically connected to each other by a bus such that signals can be transmitted and received between them.

The bus master 10 issues a bus request (or a bus request signal) to the bus slave 20. The bus master 10 includes a flip-flop 11 for outputting the bus request signal. The bus master 10 comprises, for example, a central processing unit (CPU), a direct memory access controller (DMAC), or the like.

In response to the bus request, the bus slave 20 notifies the bus master 10 that a bus response is enabled (or supplies a bus response enable signal to the bus master 10). The bus slave 20 includes a bus response control circuit 21, a flip-flop 22 and a logical multiplication circuit (AND circuit) 23. The bus slave 20 comprises, for example, a memory or the like.

The clock gating circuit 30 controls the supply of clocks to the bus slave 20. To be more specific, the clock gating circuit 30 shuts off clocks generated by a clock generation circuit (not shown) of the semiconductor integrated circuit 100 or clocks externally input thereto; alternatively, the clock gating circuit 30 allows those clocks to be supplied to the bus slave 20. The clock gating circuit 30 includes, for example, an AND circuit.

A description will be given of circuit connections in the semiconductor integrated circuit 100. The flip-flop 11 of the bus master 10 is connected to the bus response control circuit 21 of the bus slave 20. The first output terminal of the bus response control circuit 21 is connected to the first input terminal of the clock gating circuit 30 and is also connected to the input terminal of the flip-flop 22 of the bus slave 20.

The second input terminal of the clock gating circuit 30 receives clock CLK1 (referred to as a pre-gate clock). Pre-gate clock CLK1 may be supplied from the clock generation circuit of the semiconductor integrated circuit 100 or from an external device of the semiconductor integrated circuit 100.

The output terminal of the clock gating circuit 30 is connected to the clock input terminal of the flip-flop 22 of the bus slave 20. When the clock gating circuit 30 is open, pre-gate clock CLK1 is output from the output terminal of the clock gating circuit 30. In the descriptions below, pre-gate clock CLK1 output from the clock gating circuit 30 will be referred to as post-gate clock CLK2. Post-gate clock CLK2 supplied to the bus slave 20 is used as a synchronization clock in the circuit operations of the bus slave 20 (in the case of a memory, the circuit operations are data writing and data reading).

The output terminal of the flip-flop 22 is connected to the first input terminal of the AND circuit 23. The second output terminal of the bus response control circuit 21 is connected to the second input terminal of the AND circuit 23. The output terminal of the AND circuit 23 is connected to the bus master 10.

[1-2] Operation of Semiconductor Integrated Circuit

The total of (i) the signal propagation time from the flip-flop 11 of the bus master 10 to the bus response control circuit 21 of the bus slave 20, (ii) the signal propagation time from the bus response control circuit 21 of the bus slave 20 to the clock gating circuit 30 and (iii) the clock propagation time from the clock gating circuit 30 to the flip-flop 22 of the bus slave 20 will be referred to as a total delay time.

Figure 2:
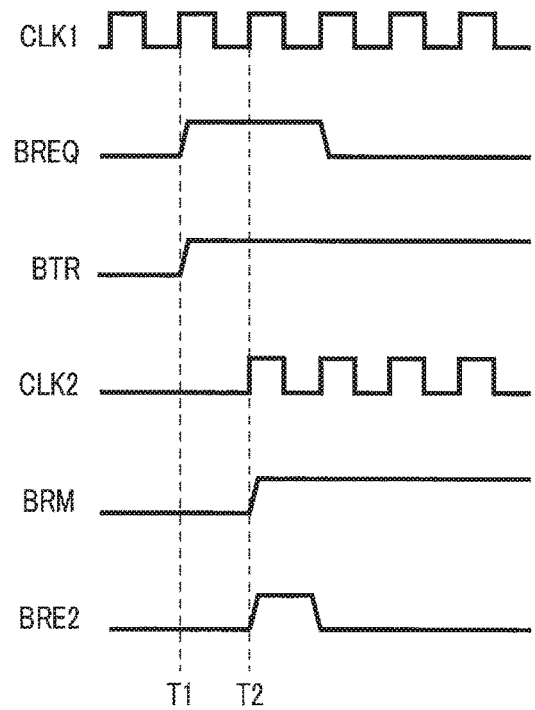
FIG. 2 is a timing chart showing a first example of an operation which the semiconductor integrated circuit of a first embodiment performs.
Figure 3:
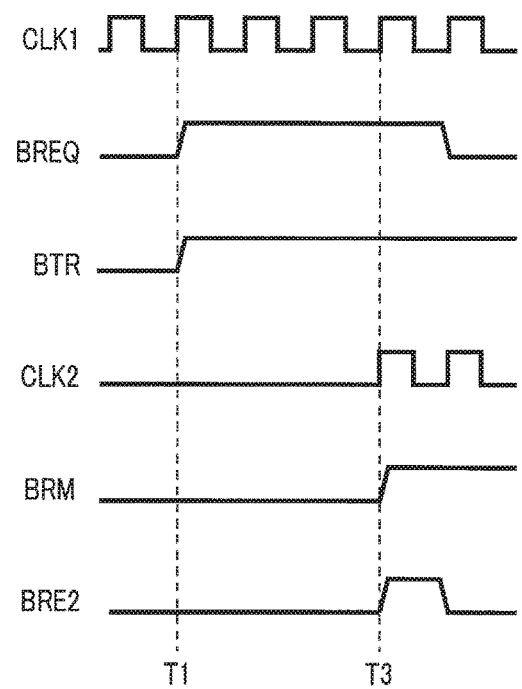
FIG. 3 is a timing chart showing a second example of an operation which the semiconductor integrated circuit of the first embodiment performs.
Figure 4:
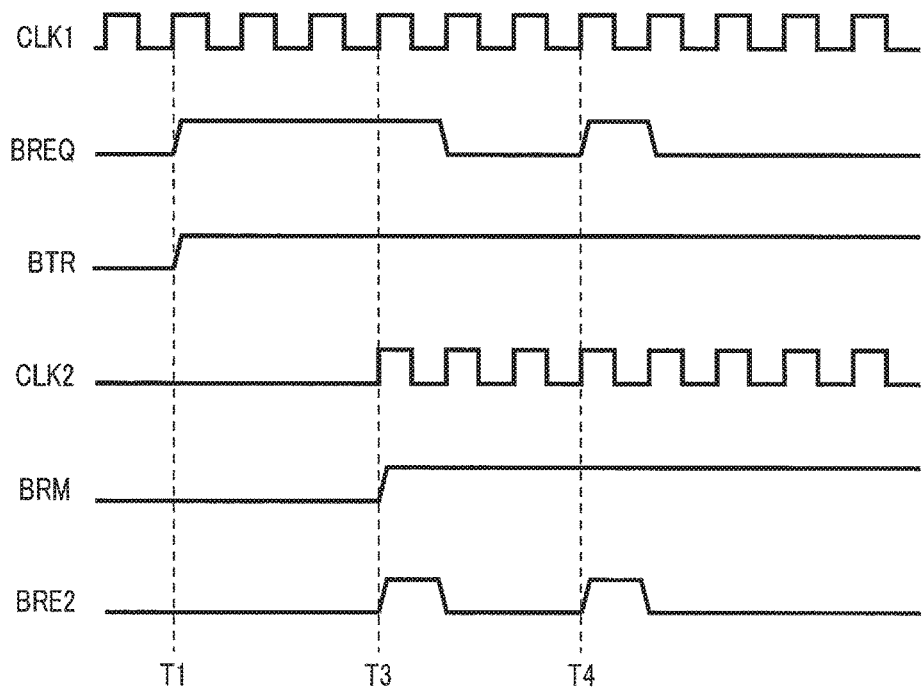
FIG. 4 is a timing chart showing a third example of an operation which the semiconductor integrated circuit of the first embodiment performs.

An operation of the semiconductor integrated circuit of the first embodiment will be described with reference to FIG. 2, FIG. 3 and FIG. 4. FIG. 2, FIG. 3 and FIG. 4 are timing charts showing an operation which the semiconductor integrated circuit 100 performs. FIG. 2 illustrates the case where the total delay time is not longer than one cycle, and FIG. 3 illustrates the case where the total delay time is longer than two cycles and not longer than three cycles.

Referring to FIG. 2 and FIG. 3, bus request signal BREQ is output from the bus master 10 to the bus response control circuit 21 of the bus slave 20. To be specific, bus request signal BREQ is asserted, and, for example, "H" is output to the bus response control circuit 21 (time T1). Bus request signal BREQ is a signal indicating that the bus master 10 requests access to the bus slave 20. "H" represents a voltage of high level.

In response to bus request signal BREQ, the bus response control circuit 21 outputs bus transfer signal BTR to the first input terminal of the clock gating circuit 30. To be specific, bus transfer signal BTR is asserted based on bus request signal BREQ, and, for example, "H" is output to the clock gating circuit 30. Bus transfer signal BTR is a signal for controlling the open state/closed state of the clock gating circuit 30, and "H" is maintained until the end of the operation of the bus slave 20.

Pre-gate CLK1 is supplied to the second input terminal of the clock gating circuit 30. When the clock gating circuit 30 receives bus transfer signal BTR ("H"), the clock gating circuit 30 opens and post-gate clock CLK2 is output from the output terminal of the clock gating circuit 30.

Where the total delay time is not longer than one cycle of pre-gate clock CLK1, post-gate clock CLK2 is output at a time (time T2) which is one cycle after the rise of bus request signal BREQ (or bus transfer signal BTR), as shown in FIG. 2. Where the total delay time is longer than two cycles and not longer than three cycles, post-gate clock CLK2 is output at a time (time T3) which is three cycles after the rise of bus request signal BREQ (or bus transfer signal BTR), as shown in FIG. 3.

Post-gate clock CLK2 is supplied to the clock input terminal of the flip-flop 22. When post-gate clock CLK2 is supplied to the clock input terminal, bus transfer signal BTR supplied to the input terminal of the flip-flop 22 is output from the output terminal of the flip-flop 22 as bus response mask signal BRM ("H"). Bus response mask signal BRM indicates that post-gate clock CLK2 reaches the bus slave 20.

Bus response mask signal BRM is supplied to the first input terminal of the AND circuit 23. Bus response enable signal BRE1 ("H") is supplied from the bus response control circuit 21 to the second input terminal of the AND circuit 23. Bus response enable signal BRE1 represents the state of the bus slave 20 and indicates whether or not an access request made by the bus master 10 can be complied with. When the bus request enable signal BRE1 is "H", the access request can be complied with.

Bus response enable signal BRE2 ("H") is output to the bus master 10 from the output terminal of the AND circuit 23. Bus response enable signal BRE2 indicates that post-gate clock CLK2 reaches the bus slave 20 and that the bus slave 20 is in the state where the access request made by the bus master can be complied with. By outputting bus response enable signal BRE2 ("H") to the bus master 10, the bus slave 20 informs the bus master 10 that the bus slave 20 can comply with the access request made by the bus master 10.

Thereafter, signals and data are exchanged between the bus master 10 and the bus slave 20.

An operation performed when a bus request is successively made will be described with reference to FIG. 4. FIG. 4 illustrates the case where the bus request is successively made and the total delay time is longer than two cycles and not longer than three cycles.

When bus request signal BREQ is input first time, bus response enable signal BRE2 is output at time T3, as in the case shown in FIG. 3. Thereafter, bus request signal BREQ is input second time (time T4). When bus request signal BREQ is input at time T4, bus transfer signal BTR maintains "H", so that bus response enable signal BRE2 can be output at time T4 with no delay.

When the first-time bus request is made, the bus master 10 keeps the standby state (or stationary) from the output of bus request signal BREQ to the issuance of bus response enable signal BRE2, as in the case shown in FIG. 3. When the second-time bus request is made, however, the bus master 10 does not have to stand by since the clock (post-gate clock) is already supplied thereto.

[1-3] Advantages of First Embodiment

According to the first embodiment, a semiconductor integrated circuit capable of reducing power consumption without degrading the operating performance can be provided.

A detailed description will be given of the advantages of the first embodiment. Where clocks are supplied from the clock gating circuit 30 to the bus slave 20, there is inevitably a delay (total delay time) from the issuance of a bus request by the bus master 10 to the start of the clock supply to the bus slave 20. This delay varies depending upon the condition of the voltage applied to the circuit elements constituting the transmission line of clocks, the temperature condition of the transmission line, the performance variations of the circuit elements caused during manufacture, etc.

By way of comparative example, let us consider the case where an allowable maximum value of the total delay time is determined in advance, physical designs are determined such that the total delay time is less than the allowable maximum value under probable operating conditions, and a bus master is stopped by a predetermined number of cycles to ensure a normal operation as long as the total delay time is less than the allowable maximum value. In this case, the stop time of the bus master must be set to be an allowable maximum value because the total delay time varies, as mentioned above. In many cases, however, a semiconductor integrated circuit including a bus master and a bus slave is operated under the conditions that make the propagation time shorter than allowable maximum value. Therefore, the total delay time hardly becomes equal to the allowable maximum value, and the bus master is stopped unnecessarily.

According to the present embodiment, it is not necessary to determine the standby time (or the stop time) of the bus master in advance, and the bus master 10 can issue a bus response in accordance with the total delay time that may vary due to the voltage condition, the temperature condition and the performance variations caused at the time of manufacture, and the standby time of the bus master 10 can be as short as possible. Accordingly, the power consumption by the clock gating circuit 30 can be reduced, and the unnecessary standby time of the bus master 10 can be shortened. Therefore, the operating performance of the semiconductor integrated circuit is not affected.

According to the present embodiment, even if a bus request is successively made, the bus master 10 stands by when the first-time bus request is made. When the second-time and subsequent bus requests are made, the clock (post-gate clock) is already supplied, so that the bus master 10 does not have to stand by. Accordingly, the operating performance of the semiconductor circuit is not affected.

[2] Second Embodiment

A semiconductor integrated circuit according to the second embodiment will be described. According to the second embodiment, a plurality of clock gating circuits are arranged on a clock transmission line, and a gating adjustment circuit is provided to adjust the open state/closed state of the clock gating circuits. Reference will be made to the case where three clock gating circuits are arranged.

[2-1] Configuration of Semiconductor Integrated Circuit

Figure 5:
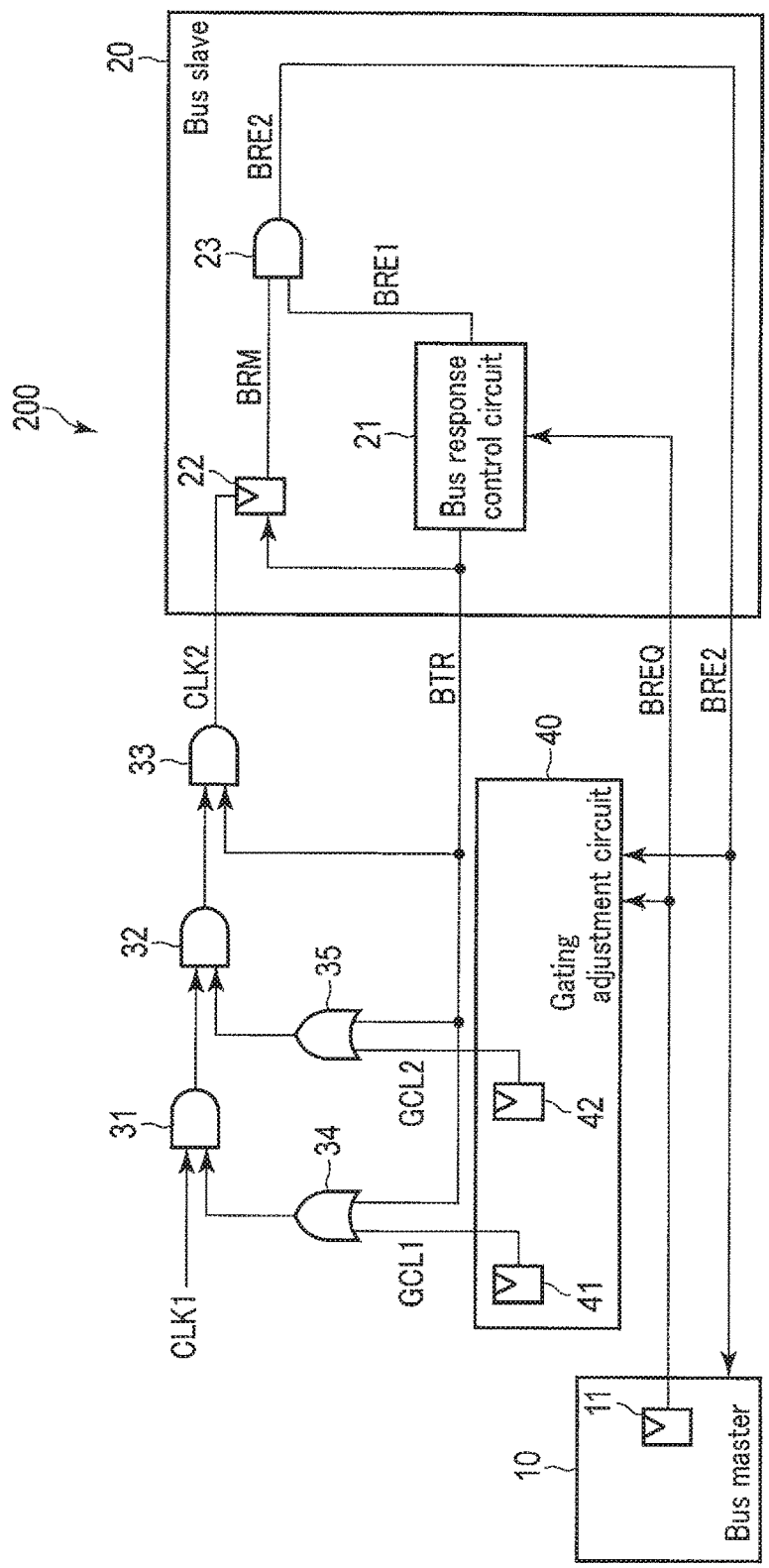
FIG. 5 is a diagram illustrating a configuration of a semiconductor integrated circuit according to a second embodiment.

FIG. 5 is a diagram illustrating a configuration of a semiconductor integrated circuit according to the second embodiment. The semiconductor integrated circuit 200 includes a bus master 10, a bus slave 20, a clock gating circuits 31, 32 and 33, logical OR circuits (OR circuits) 34 and 35 and a gating adjustment circuit 40. The bus master 10, the bus slave 20, the clock gating circuits 31 to 33 and the gating adjustment circuit 40 are electrically connected to each other by a bus such that signals can be transmitted and received between them.

The clock gating circuits are arranged in the order of circuit 31, circuit 32 and circuit 33 from the supply side of clock CLK1. The clock gating circuits 31 to 33 are circuits that control the supply of clocks to the bus slave 20 and permit or stop the supply of clocks to the bus slave 20. Each of the clock gating circuits 31 to 33 includes, for example, an AND circuit.

The gating adjustment circuit 40 monitors the standby time of the bus master 10 and adjusts the open state/closed state of clock gating circuits 31 and 32, based on the standby time. The gating adjustment circuit 40 includes, for example, flip-flops 41 and 42.

A description will be given of circuit connections in the semiconductor integrated circuit 200. Flip-flop 11 of the bus master 10 is connected to the bus response control circuit 21 of the bus slave 20 and the gating adjustment circuit 40. The first output terminal of the bus response control circuit 21 is connected to the first input terminal of clock gating circuit 33, the first input terminal of OR circuit 34, the first input terminal of OR circuit 35, and the input terminal of flip-flop 22 of the bus slave 20.

The output terminal of flip-flop 41 of the gating adjustment circuit 40 is connected to the second input terminal of OR circuit 34. Gating control signal GCL1 is output from the output terminal of flip-flop 41 to the second input terminal of OR circuit 34. Likewise, the output terminal of flip-flop 42 of the gating adjustment circuit 40 is connected to the second input terminal of OR circuit 35. Gating control signal GCL2 is output from the output terminal of flip-flop 42 to the second input terminal of OR circuit 35.

The output terminal of OR circuit 34 is connected to the first input terminal of clock gating circuit 31. Pre-gate CLK1 is supplied to the second input terminal of clock gating circuit 31. The output terminal of OR circuit 35 is connected to the first input terminal of clock gating circuit 32. The output terminal of clock gating circuit 31 is connected to the second input terminal of clock gating circuit 32. The output terminal of clock gating circuit 32 is connected to the second input terminal of clock gating circuit 33.

The output terminal of clock gating circuit 33 is connected to the clock input terminal of flip-flop 22 of the bus slave 20. When the clock gating circuits 31 to 33 are open, post-gate clock CLK2 is output from the output terminal of clock gating circuit 33. Post-gate clock CLK2 supplied to the bus slave 20 is used as a synchronization clock in the circuit operations of the bus slave 20 (in the case of a memory, the circuit operations are data writing and data reading).

The first output terminal of the bus response control circuit 21 is connected to the input terminal of flip-flop 22. The output terminal of flip-flop 22 is connected to the first input terminal of the AND circuit 23. The second output terminal of the bus response control circuit 21 is connected to the second input terminal of the AND circuit 23. The output terminal of the AND circuit 23 is connected to the bus master 10.

The other configurations of the second embodiment are similar to those of the first embodiment.

[2-2] Operation of Semiconductor Integrated Circuit

Figure 6:
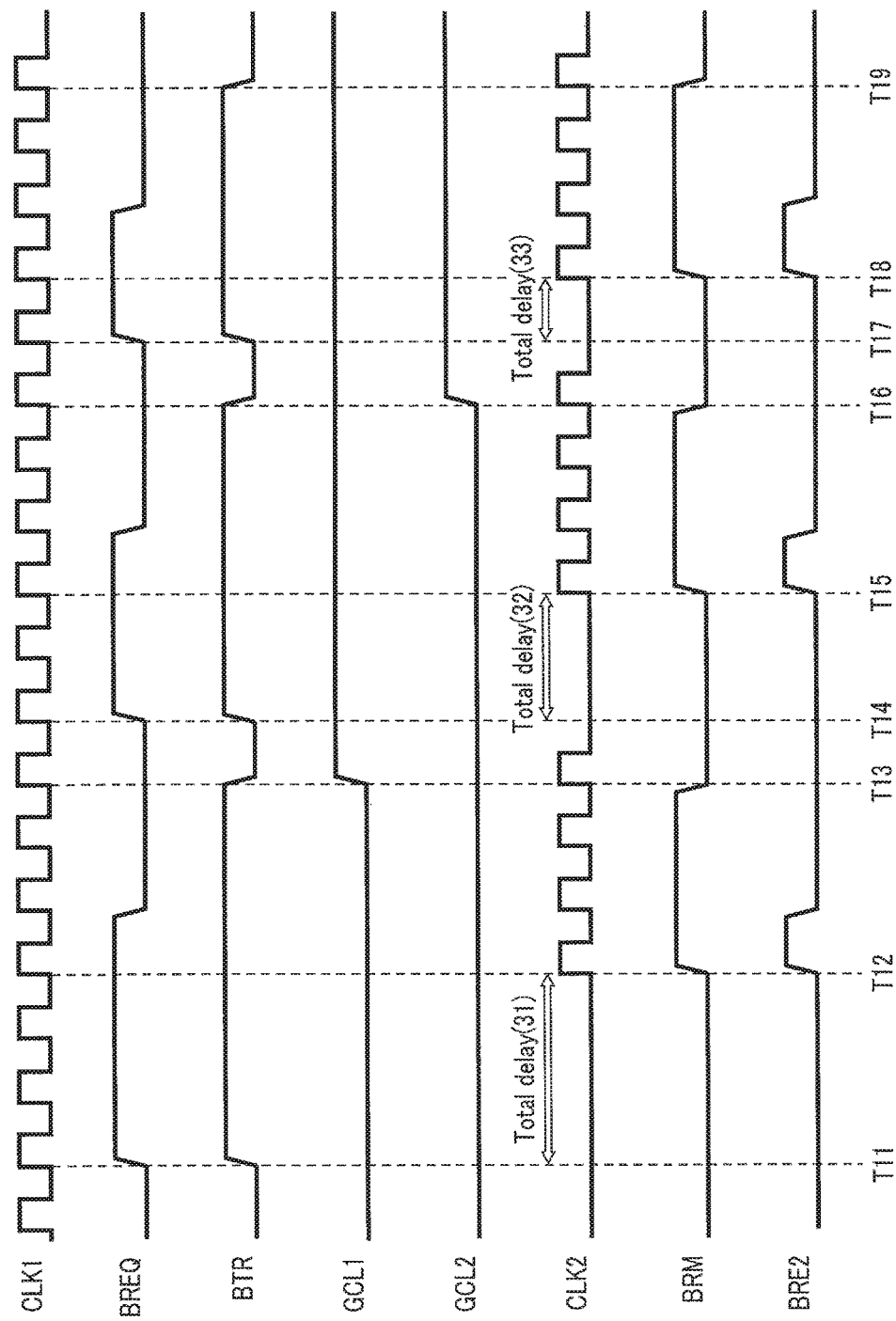
FIG. 6 is a timing chart showing an operation which the semiconductor integrated circuit of the second embodiment performs.

FIG. 6 is a timing chart showing an operation which the semiconductor integrated circuit 200 of the second embodiment performs. FIG. 6 illustrates the case where a bus request is generated intermittently and the gating adjustment circuit operates in accordance with the total delay time. Let us assume that the total delay time caused when clock gating circuit 31 is used is represented as total delay (31), the total delay time required when clock gating circuit 32 is used is represented as total delay (32), and the total delay time required when clock gating circuit 33 is used is represented as total delay (33).

In the initial state, control signals GCL1 and GCL2 output from the gating adjustment circuit 40 are both set as "L." At this time, clock gating circuit 31 shuts off pre-gate clock CLK1. Subsequently, first-time bus request signal BREQ is output from the bus master 10, and bus transfer signal BTR is output from the bus response control circuit 21 (time T11). In response to this, the clock gating circuits 31 to 31 open, and post-gate clock CLK2 is supplied from clock gating circuit 33 to flip-flop 22 (Time T12). In this case, the delay between the time when bus request signal BREQ is output and the time when post-gate clock CLK2 reaches flip-flop 22 is total delay (31).

Where this total delay (31) is long and the standby time (or stop time) of the bus master 10 is longer than an allowable range, the gating adjustment circuit 40 sets control signal GCL1 to "H" and sets control signal GCL2 to "L." At the time, clock gating circuit 32 shuts off pre-gate clocks CLK1. Subsequently, second-time bus request signal BREQ is output from the bus master 10, and bus transfer signal BTR is output from the bus response control circuit 21 (time T14). In response to this, clock gating circuits 32 and 33 open, and post-gate clock CLK2 is supplied from clock gating circuit 32 to flip-flop 22 (Time T15). In this case, the delay between the time when bus request signal BREQ is output and the time when post-gate clock CLK2 reaches flip-flop 22 is total delay (32).

Where this total delay (32) is long and the standby time of the bus master 10 is longer than an allowable range, the gating adjustment circuit 40 sets both control signals GCL1 and GCL2 to "H." At the time, clock gating circuit 33 shuts off pre-gate clock CLK1. Subsequently, third-time bus request signal BREQ is output from the bus master 10, and bus transfer signal BTR is output from the bus response control circuit 21 (time T17). In response to this, clock gating circuit 33 opens, and post-gate clock CLK2 is supplied from clock gating circuit 33 to flip-flop 22 (Time T18). In this case, the delay between the time when bus request signal BREQ is output and the time when post-gate clock CLK2 reaches flip-flop 22 is total delay (33).

In this manner, the gating adjustment circuit 40 monitors the standby time of the bus master 10 and adjusts clock gating circuits 31 and 32, based on the standby time. As a result, the standby time of the bus master 10 falls within the allowable range, and the semiconductor integrated circuit 200 can operate normally.

The magnitude relations among the delay times are: total delay (31)>total delay (32)>total delay (33). Total delay (31), total delay (32) and total delay (33) can be monitored as the standby times of the bus master 10 (namely, the period between the time when a bus request is issued and the time when a bus response enable signal is received). The magnitude relations among the consumption powers of clock gating circuits 31 to 33 are as follows: clock gating circuit 31<clock gating circuit 32<clock gating circuit 33. This is because the consumption power decreases in accordance with an increase in the percentage of the clock propagation line portion in that clock signal is stable by gating. A 6-clock cycle (time T11 to time T13) is required before access is enabled in response to the first-time bus request, whereas a 5-clock cycle (time T14 to time T16) is required before access is enabled in response to the second-time bus request and a 4-clock cycle (time T17 to time T19) is required before access is enabled in response to the third-time bus request.

When a predetermined time elapses after clock gating circuits 31 and 32 are adjusted in accordance with the standby time, as above, clock gating circuits 31 and 32 may be returned to the initial state (the clock supply stop state), and clock gating circuits 31 and 32 may be adjusted once again in accordance with the standby time. Where the clock gating circuits are returned to the initial state and adjusted again after the elapse of the predetermined time, a proper clock gating circuit can be selected in accordance with how the usage environment and circumstances are at the time. The predetermined time can be measured by use of a timer or software.

[2-3] Advantages of Second Embodiment

Like the first embodiment, the second embodiment enables the standby time of the bus master 10 to be optimally determined for each semiconductor integrated circuit in consideration of the total delay time, which varies in accordance with the operating environment of the semiconductor integrated circuit. Accordingly, the power consumption by the clock gating circuits can be reduced, and the unnecessary standby time of the bus master 10 can be shortened. Therefore, the operating performance of the semiconductor integrated circuit is not affected.

Furthermore, according to the second embodiment, a clock gating circuit used for shutting off clock CLK1 can be selected in accordance with whether the standby time of the bus master 10, which depends upon the selected clock gating circuit, is within an allowable range. Therefore, a clock gating circuit (a position on the clock transmission line) which permits the standby time to be within the allowable range and which provides the most effective power consumption can be adaptively selected.

Although three clock gating circuits are employed in the configuration shown in FIG. 5, the number of clock gating circuits is not limited to this. The number of clock gating circuits may be two; alternatively, the number may be not less than four. In the configuration shown in FIG. 5, an OR circuit is not connected to the last-stage clock gating circuit and no control signal is supplied thereto. Needless to say, an OR circuit may be connected to the last-stage clock gating circuit and its control signal may be supplied.

The other advantages of the second embodiment are similar to those of the first embodiment.

[3] Modifications Etc.

In the first and second embodiments, the determination logic and the control logic can be realized in various manners, including installation based on threshold values and installation based on switches. Any manner of installation is applicable. The first and second embodiments are applicable to various types of semiconductor integrated circuit having a master-and-slave relationship. For example, they can be applied to a system LSI, an ASIC, a general LSI, etc.

While certain embodiments have been described, these embodiments have been presented by way of example only, and are not intended to limit the scope of the embodiments. Indeed, the novel embodiments described herein may be embodied in a variety of other forms; furthermore, various omissions, substitutions and changes in the form of the embodiments described herein may be made without departing from the spirit. The accompanying claims and their equivalents are intended to cover such forms or modifications as would fall within the scope and spirit.

What is claimed is:

1. A semiconductor integrated circuit comprising:
    a bus master which outputs an access request;
    a bus slave which receives the access request and transmits a response to the access request to the bus master; and
    a clock gating circuit which shuts off clocks supplied to the bus slave,
    wherein the bus slave includes:
    a control circuit which outputs a first signal and a second signal in response to the access request;
    a first circuit which outputs a third signal in response to a clock supplied from the clock gating circuit, when the first signal is asserted; and
    a second circuit which receives the third signal output from the first circuit and the second signal, and which outputs a fourth signal as the response to the access request to the bus master, when the second signal is asserted.

2. The semiconductor integrated circuit according to claim 1, wherein the clock gating circuit includes an AND circuit.

3. The semiconductor integrated circuit according to claim 1, wherein the first circuit includes a flip-flop including a clock input terminal, an input terminal and an output terminal, and
the flip-flop outputs the third signal from the output terminal, when a clock is supplied to the clock input terminal.

4. The semiconductor integrated circuit according to claim 1, wherein the second signal is asserted in a state where the bus slave is ready to respond, regardless of whether the clock is supplied.

5. The semiconductor integrated circuit according to claim 1, further comprising an adjustment circuit which selects whether the clock gating circuit should be in an open state or a closed state.

6. The semiconductor integrated circuit according to claim 5, wherein the clock gating circuit outputs the clock to the first circuit when an adjustment signal is asserted by the adjustment circuit.

7. The semiconductor integrated circuit according to claim 5, wherein the first circuit outputs the third signal in response to a clock supplied from the clock gating circuit, when the adjustment signal is asserted by the adjustment circuit.

8. The semiconductor integrated circuit according to claim 5, further comprising an OR circuit arranged between the adjustment circuit and the clock gating circuit,
wherein the adjustment signal is input to a first input terminal of the OR circuit, and the first signal is input to a second input terminal of the OR circuit.

9. The semiconductor integrated circuit according to claim 8, wherein the adjustment circuit receives the access request and the response, and outputs the adjustment signal to the OR circuit, based on a time difference between reception of the access request and reception of the response.

10. A semiconductor integrated circuit comprising:
a bus master which outputs an access request;
a bus slave which receives the access request and transmits a response to the access request to the bus master;
first and second clock gating circuits which shut off clocks supplied to the bus slave; and
an adjustment circuit which outputs a first adjustment signal selecting whether the first clock gating circuit should be in an open state or in a closed state, and which also outputs a second adjustment signal selecting the second adjustment signal selecting whether the second clock gating circuit should be in an open state or in a closed state,
wherein the bus slave includes:
a control circuit which outputs a first signal and a second signal in response to the access request;
a first circuit which outputs a third signal in response to a clock supplied from the first and second clock gating circuits, when the first signal or the first and second adjustment signals are asserted; and
a second circuit which receives the third signal output from the first circuit and the second signal, and which outputs a fourth signal to the bus master as the response to the access request, when the second signal is asserted.

11. The semiconductor integrated circuit according to claim 10, the first and second clock gating circuits include an AND circuit.

12. The semiconductor integrated circuit according to claim 11, further comprising a first OR circuit arranged between the adjustment circuit and the first clock gating circuit and a second OR circuit arranged between the adjustment circuit and the second clock gating circuit,
wherein the first adjustment signal is input to the first OR circuit, the second adjustment signal is input to the second OR circuit, and the first signal is input to the first and second OR circuits.

13. The semiconductor integrated circuit according to claim 12, wherein the adjustment circuit receives the access request and the response, and outputs the first and second adjustment signals to the first and second OR circuits, respectively, based on a time difference between reception of the access request and reception of the response.

14. The semiconductor integrated circuit according to claim 10, wherein the first and second clock gating circuits are on a transmission line through which clocks are supplied to the bus slave, and are arranged in series in order from a clock supply side, and
if a time difference between reception of the access request and reception of the response is larger than a first value when the first clock gating circuit is in the closed state and the access request is input, then the adjustment circuit sets the first clock gating circuit in the open state and sets the second clock gating circuit in the closed state.

15. The semiconductor integrated circuit according to claim 10, wherein the first circuit includes a flip-flop including a clock input terminal, an input terminal and an output terminal, and
the flip-flop outputs the third signal from the output terminal, when a clock is supplied to the clock input terminal.

16. The semiconductor integrated circuit according to claim 10, wherein the second signal is asserted in a state where the bus slave is ready to respond, regardless of whether the clock is supplied.

* * * * *